(12) United States Patent
Bordes et al.

(10) Patent No.: US 9,094,716 B2
(45) Date of Patent: Jul. 28, 2015

(54) METHODS FOR CODING AND DECODING A BLOCK OF PICTURE DATA, DEVICES FOR CODING AND DECODING IMPLEMENTING SAID METHODS

(75) Inventors: Philippe Bordes, Cesson Sevigne Cedex (FR); Anita Orhand, Cesson Sevigne Cedex (FR)

(73) Assignee: THOMSON LICENSING, Issy les Moulineaux (FR)

( * ) Notice: Subject to any disclaimer, the term of this patent is extended or adjusted under 35 U.S.C. 154(b) by 682 days.

(21) Appl. No.: 13/138,901

(22) PCT Filed: Jan. 7, 2010

(86) PCT No.: PCT/EP2010/050106
§ 371 (c)(1),
(2), (4) Date: Jan. 27, 2012

(87) PCT Pub. No.: WO2010/121842
PCT Pub. Date: Oct. 28, 2010

(65) Prior Publication Data
US 2012/0121010 A1    May 17, 2012

(30) Foreign Application Priority Data
Apr. 23, 2009   (FR) .................................. 09 52667

(51) Int. Cl.
*H04N 7/26*    (2006.01)
*H04N 21/4402*    (2011.01)
(Continued)

(52) U.S. Cl.
CPC ..... *H04N 21/440254* (2013.01); *H04N 19/103* (2014.11); *H04N 19/176* (2014.11); *H04N 19/593* (2014.11); *H04N 19/61* (2014.11)

(58) Field of Classification Search
CPC ........... H04N 7/26; H04N 11/04; H04N 7/12; H04N 7/133; H04N 7/46; H04N 7/50; G06K 9/36; H04B 1/66

USPC ........ 375/240.02–240.19, E07.123, E07.139, 375/240.01, 243, 245; 704/501, 502; 382/48, 250, 251, 253
See application file for complete search history.

(56) References Cited

U.S. PATENT DOCUMENTS 5,001,561 A * 3/1991 Haskell et al. ............ 375/240.02
5,838,376 A * 11/1998 Sugiyama .................. 348/397.1
(Continued)

FOREIGN PATENT DOCUMENTS

CN    101031084    5/2007
CN    101060626    10/2007
(Continued)

OTHER PUBLICATIONS

"Video Codec Implementation, DC Image Extraction and Shot Segmentation", by Aravind Sundaresqan et al., ENEE 631, Fall 2001 Course Project Report.*

(Continued)

*Primary Examiner* — Dave Czekaj
*Assistant Examiner* — Dramos I Kalapodas
(74) *Attorney, Agent, or Firm* — Tutunjian & Bitetto, P.C.

(57) ABSTRACT

A method for coding a block of picture data is disclosed. The method comprises the following steps:
determining a prediction coefficient of a DC coefficient of a block from a DC coefficient of at least one previously reconstructed reference block,
determining, for each pixel of the block, a prediction value such that the average of prediction values is proportional to the prediction coefficient to a proportionality coefficient close,
calculating, for each pixel of the block, a residual value by subtracting from the picture data of the pixel the prediction value of the pixel,
transforming the block of residual values by a first transform into a first block of coefficients,
replacing, in the first block of coefficients, the DC coefficient by the difference between the product of the proportionality coefficient and the average of picture data of the block and the prediction coefficient, and
quantizing and coding the first block of coefficients.

5 Claims, 9 Drawing Sheets

Figure 1:
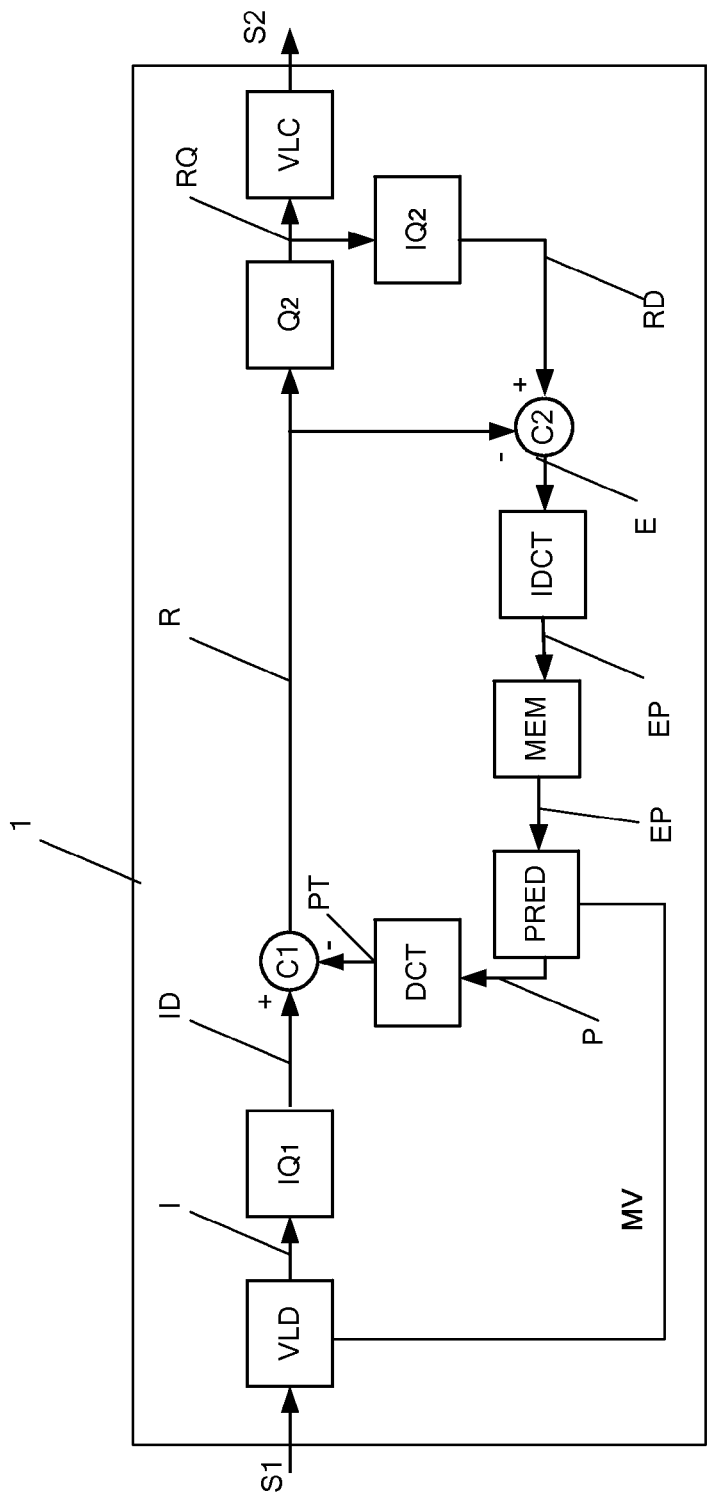

(51) Int. Cl.
*H04N 19/176* (2014.01)
*H04N 19/61* (2014.01)
*H04N 19/593* (2014.01)
*H04N 19/103* (2014.01)
*H04B 1/66* (2006.01)

(56) References Cited

U.S. PATENT DOCUMENTS

| | | | |
|---|---|---|---|
| 6,104,757 A * | 8/2000 | Rhee | 375/240.12 |
| 6,168,442 B1 * | 1/2001 | Naoi | 439/91 |
| 6,222,881 B1 * | 4/2001 | Walker | 375/240.03 |
| 7,929,608 B2 * | 4/2011 | Krishnan | 375/240.13 |
| 7,933,328 B2 * | 4/2011 | DeGarrido et al. | 375/240.03 |
| 8,059,721 B2 * | 11/2011 | Chang et al. | 375/240.18 |
| 8,798,137 B2 * | 8/2014 | Po et al. | 375/240.02 |
| 2006/0109911 A1 | 5/2006 | Jang et al. | |
| 2006/0188164 A1 * | 8/2006 | Lee et al. | 382/238 |
| 2006/0222067 A1 * | 10/2006 | Park et al. | 375/240.08 |
| 2007/0153892 A1 * | 7/2007 | Yin et al. | 375/240.03 |
| 2007/0237224 A1 * | 10/2007 | Krishnan | 375/240.12 |

FOREIGN PATENT DOCUMENTS

| | | | |
|---|---|---|---|
| EP | 1289304 | | 3/2003 |
| EP | 1995973 | | 11/2008 |
| FR | 2908259 | | 5/2008 |
| TW | 358309 | | 5/1999 |
| WO | WO 98/27741 | * | 6/1998 |
| WO | WO9827741 | | 6/1998 |
| WO | WO 2007086589 | * | 8/2007 |
| WO | WO2007086589 | | 8/2007 |

OTHER PUBLICATIONS

"Video Codec Implementation, DC Image Extraction and Shot Segmentation", by Aravind Sundarescian et al., ENEE 631, Fall 2001 Course Project Report.*
"Multi-program Video Data Compression", by G. J. Keesman, Thesis Technische Universitat Delft. ISBN 90-74445-20-9, 1995.*
Lefol et al., "Peformance Evaluation of Transcoding Algorithms for H.264", pp. 215-222.
Keeman, "Multi-program Video Data Compression", Jan. 1, 1995, pp. 149-178.
Search Report Dated March 15, 2010.
"Advanced video coding for generic audiovisual services", ITU-T Rec. H264/ISO/IEC 14496-10 AVC (MPEG4) or JVT H/264, Jan. 2012.
Bordes etal: "improved algorithm for fast bit rate transcoding H.264/AVC", 2008 NEM Summit—"Towards future media internet", pp. 239-242, Oct. 13-15 2008.
"Draft call for evidence on high-performance video coding (HVC) codec", ISO/IEC/JTC1/SC29/WG11/N10177, Oct. 2008, Busan, Korea.
Kalva etal: "Exploiting the directionai features in MPEG-2 for H/264 intra transcoding", IEEE transactions on consumer electronics, vol. 52, No. 2, May 2006.
"Vision and requirements for high performance video coding (HVC) codec", ISO/IEC/JTC1/SC29/WG11/N10175, Oct. 2008, Busan, Korea.
Richardson: "H264 and MPEG4 video compression", John Wiley & Sons, New York, NY, Sep. 2003, pp. 1-307.

* cited by examiner

FIGURE 1 – PRIOR ART

METHODS FOR CODING AND DECODING A BLOCK OF PICTURE DATA, DEVICES FOR CODING AND DECODING IMPLEMENTING SAID METHODS

This application claims the benefit, under 35 U.S.C. §365 of International Application PCT/EP2010/050106, filed Jan. 7, 2010, which was published in accordance with PCT Article 21(2) on Oct. 28, 2010 in English and which claims the benefit of French patent application No. 0952667, filed Apr. 23, 2009.

1. SCOPE OF THE INVENTION

The invention relates to the general field of compression and coding of pictures. The invention relates more specifically to a method for coding, in the form of a coded data stream, a block of a picture and a method for decoding such a stream with a view to the reconstruction of this block. The invention also relates to a coding device and a decoding device implementing said methods.

2. PRIOR ART

A transcoding device is used to modify the coding cost of a sequence of pictures. Indeed, it is sometimes necessary to transfer a coded data stream representative of a sequence of pictures of a first network of bandwidth B1 to a second network of bandwidth B2, where B1>B2. For this purpose, a transcoding device is used to modify the coding cost of said sequence of pictures, i.e. the number of bits used to encode it. Such a transcoding device also enables a coded data stream to be adapted to the resources of a terminal or even to insert such a stream into a multiplex.

A transcoding device 1 of the FPDT type according to the prior art is shown in FIG. 1. It is notably described by G. J. Keesman, in the document entitled "Multi-program Video Data Compression", Thesis Technische Universität Delft. ISBN 90-74445-20-9, 1995. Such a transcoding device 1 receives at its input a first data stream coded S1 representing a sequence of pictures. The input of the transcoding device is connected to an entropy decoding module VLD, itself connected to a first inverse quantization module IQ1. The decoding module VLD decodes part of the first coded data stream into current picture data I that are then dequantized by the first dequantization module IQ1 into dequantized data ID with a first quantization step. This first quantization step is itself decoded from the stream S1. In general, the picture data I is in the form of blocks of coefficients. The quantization module IQ1 is connected to a first input of a first computation module C1. The first computation module C1 is suitable to calculate residual data R. For this purpose, the first computation module C1 computes the difference between the current dequantized data ID and prediction data PT sent to a second input of the first computation module C1. The output of the first computation module C1 is connected to the input of a quantization module Q2 suitable to quantize the residual data R into quantized residual data RQ with a second quantization step. The second quantization step is determined according to the required bitrate B2. This quantized residual data RQ is then transmitted to an entropy coding module VLC to generate part of the second coded data stream S2. It is also sent to a second dequantization module IQ2 operating an inverse quantization from the one operated by the quantization module Q2 and generating dequantized residual data RD. This dequantized residual data RD is then transmitted to a first input of a second computation module C2. The second computation module C2 is suitable to compute requantization errors data E. For this purpose, the second computation module C2 computes the difference between the dequantized residual data RD and the corresponding residual data R sent to a second input of the second computation module C2. The output of the second computation module C2 is connected to the input of a first IDCT transformation module applying a first transform to the requantization errors data E to generate requantization errors in the spatial domain also called pixel domain, called transform requantization errors data EP. The IDCT module preferentially operates an Inverse Discrete Cosine Transform. The transform requantization errors data EP are stored in a memory MEM. The memory MEM is also connected to a prediction module PRED suitable to generate intermediate prediction data P from the transform requantization errors data EP stored in the memory MEM. The prediction module PRED implements, for example, a temporal prediction by motion compensation using motion vectors MVs decoded from the coded data streams S1 in the case where the current dequantized data ID is in INTER mode. It can also implement a spatial prediction for example in the case where the current dequantized data is data in INTRA mode as defined in the video coding standard H.264. The intermediate prediction data P is then sent to the input of a second DCT transformation module that applies a second transform to said intermediate prediction data P to generate the prediction data PT. The DCT module preferentially operates a Discrete Cosine Transform.

Such a transcoding device 1 has the disadvantage of leading to a temporal or spatial drift effect. Indeed, the estimation of requantization errors made while transcoding picture data that serve as a temporal or spatial reference for other picture data is not perfect. A bias is introduced that cumulates along a group of pictures known as a GOP (Group of Pictures) within even pictures in the case of INTRA prediction leading to a progressive deterioration of the quality of said pictures until the transcoding of an INTRA type picture.

3. SUMMARY OF THE INVENTION

The purpose of the invention is to compensate for at least one disadvantage of the prior art. For this purpose, the invention relates to a method for coding a block of a picture belonging to a sequence of pictures. This block comprises pixels with each of which at least one picture data is associated. The coding method comprises the following steps to:
a) determining a prediction coefficient of a DC coefficient of a block from a DC coefficient of at least one previously reconstructed reference block,
b) determining, for each pixel of the block, a prediction value such that the average of prediction values is proportional to a proportionality coefficient close to the prediction coefficient,
c) calculating, for each pixel of the block, a residual value by subtracting from the picture data of the pixel the prediction value of the pixel,
d) transforming the block of residual values by a first transform into a first block of coefficients,
e) replacing, in the first block of coefficients, the coefficient DC by the difference between the product of the proportionality coefficient and the average of picture data of the block and the prediction coefficient, and
f) quantizing and coding the first block of coefficients.
The proportionality coefficient depends on the first transform.

According to a specific aspect of the invention, the steps a), b), c), d) and e) are applied to a plurality of spatially neighbouring blocks and the method comprises, before the step of quantizing and coding, a step of transformation by a second transform of at least a part of the coefficients of the first blocks of coefficients into a second block of coefficients.

In the particular case where the block is an INTRA block, the prediction values of pixels of the block are determined as follows:

$$X\text{pred} = Xn - \text{Avg}(Xn) + DC\text{pred}/R$$

where:
R is the proportionality coefficient,
Xn are the previously reconstructed values of pixels of neighbouring blocks used for the prediction of the block,
Avg(.) is the average function, and
DCpred is the prediction coefficient (DCpred).

In the particular case where the block is an INTER block, said prediction values (Xpred) of pixels of the block are determined as follows:

$$X\text{pred} = MV(X\text{ref}) - \text{Avg}(MV(X\text{ref})) + DC\text{pred}/R$$

where:
Xref are the previously reconstructed values of pixels of reference blocks used for the prediction of the block,
MV(.) is a motion compensation function, and
Avg(.) is the average function.

The invention also relates to a method for decoding a stream of coded data representative of a block of a picture belonging to sequence of pictures with a view to the reconstruction of the block. The method comprises the following steps:
determining a prediction coefficient of a DC coefficient of a block from a DC coefficient of at least one previously reconstructed reference block,
decoding the coded data representative of the block to reconstruct coefficients,
inverse quantization of coefficients of the block into dequantized coefficients,
inverse transformation by an inverse transform of dequantized coefficients into residual values,
determining a prediction value for each of the pixels of the block such that the average of prediction values of the block is proportional to the prediction coefficient to a proportionality coefficient close, the proportionality coefficient depending on the transform,
reconstructing for each pixel of the block a picture data by summing for the pixel the prediction value and the residual value corresponding to the pixel.

The invention also relates to a coding device of a sequence of pictures each picture of the sequence being divided into blocks of pixels with each of which at least one picture data is associated. The coding device comprises:
a prediction module for determining a prediction coefficient of a DC coefficient of a block of a picture of the sequence from a DC coefficient of at least one reference block previously reconstructed and a prediction value such that the average of prediction values is proportional to the prediction coefficient to a proportionality coefficient close,
a calculation module for calculating, for each of the pixels of the block, a residual value by subtracting from the picture data of the pixel the prediction value of the pixel,
a transformation module for transforming the block of residual values by a first transform into a first block of coefficients, for to replacing, in the first block of coefficients, the DC coefficient by the difference between the product of the proportionality coefficient and the average of picture data of the block and the prediction coefficient, and for quantizing the first block of coefficients, and
a coding module for coding the first block of coefficients, the proportionality coefficient depending on the first transform.

Moreover, the invention also relates to a device for decoding a stream of coded data representative of a sequence of pictures, each picture being divided into blocks of pixels with each of which at least one picture data is associated. The decoding device comprises:
a decoding module for decoding the coded data representative of a block of a picture of the sequence to reconstruct coefficients,
a module for applying an inverse quantization and an inverse transform on said coefficients to generate residual values,
a prediction module for determining a prediction coefficient of a DC coefficient of a block from the DC coefficient of at least one reference block previously reconstructed and a prediction value such that the average of prediction values is proportional to the prediction coefficient to a proportionality coefficient close, the proportionality coefficient depending on the transform, and
a reconstruction module for reconstructing for each pixel of the block a picture data by summing for the pixel the prediction value and the residual value corresponding to the pixel.

4. LIST OF FIGURES

Figure 2:
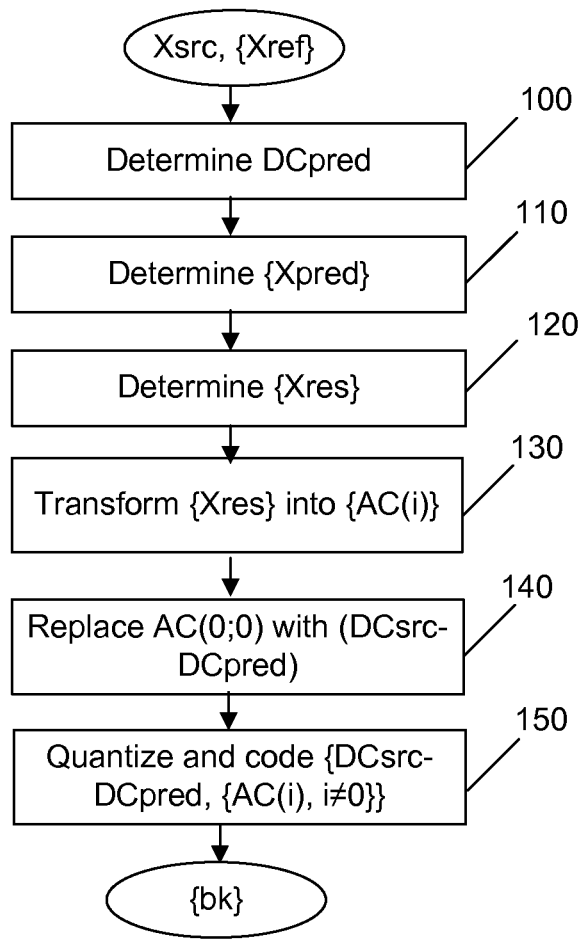
Figure 3:
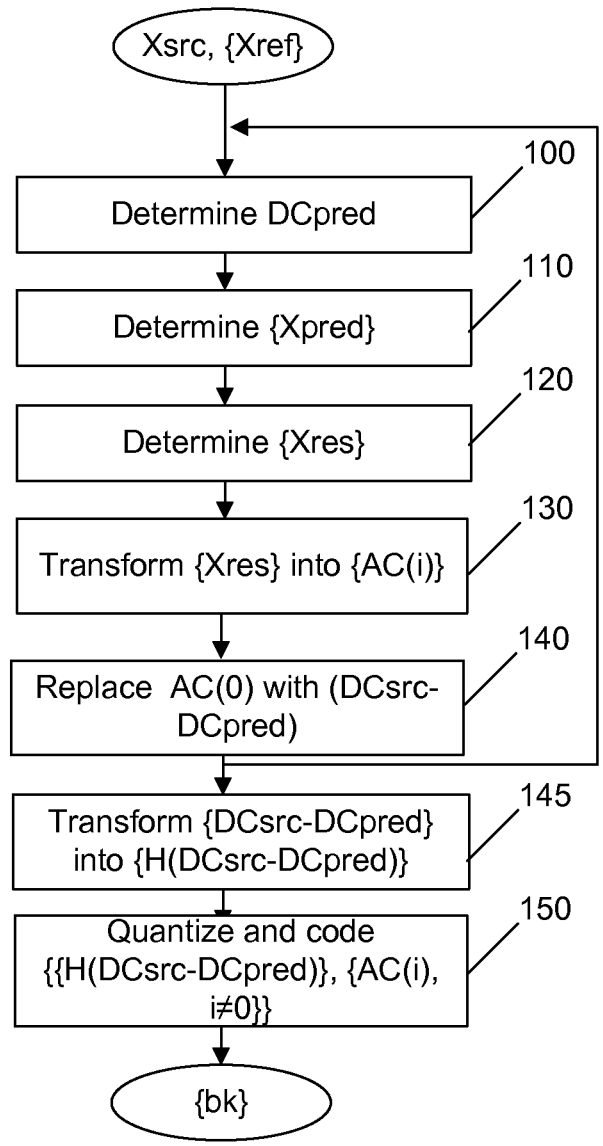
Figure 4:
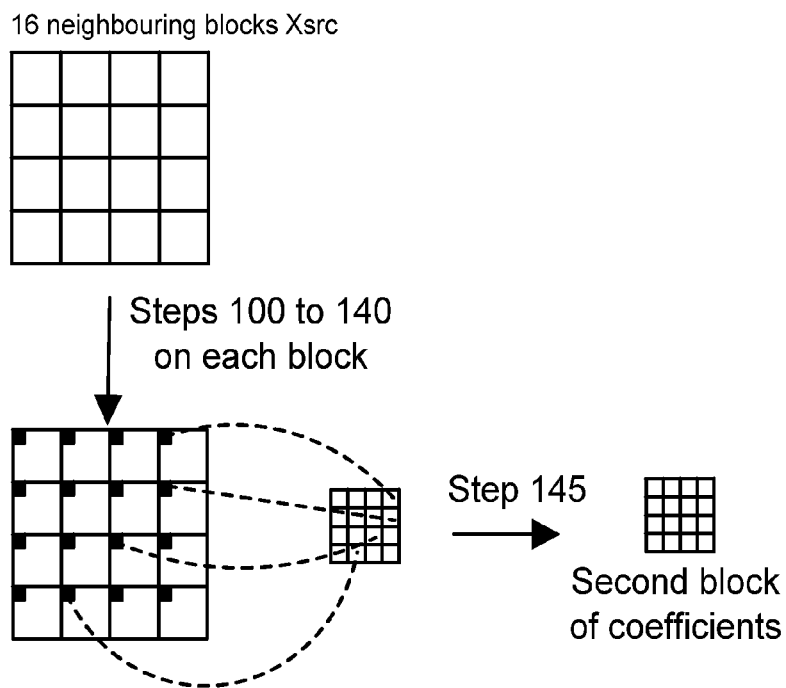
Figure 5:
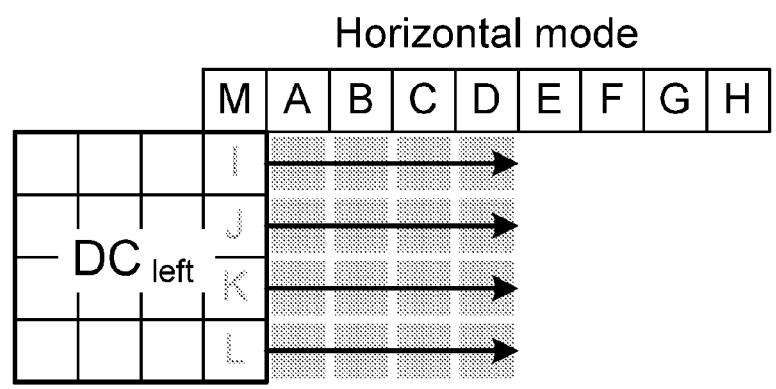
Figure 6:
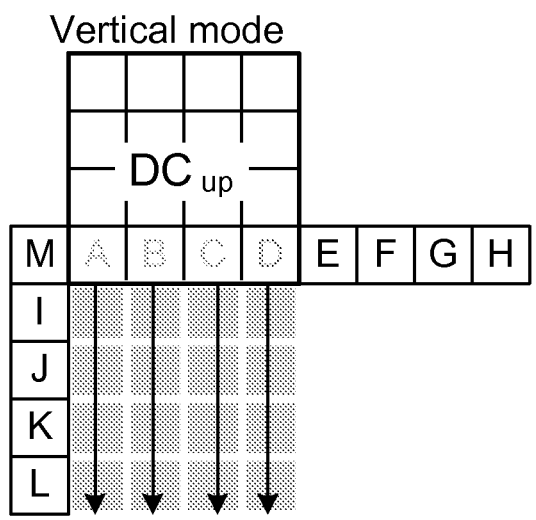
Figure 7:
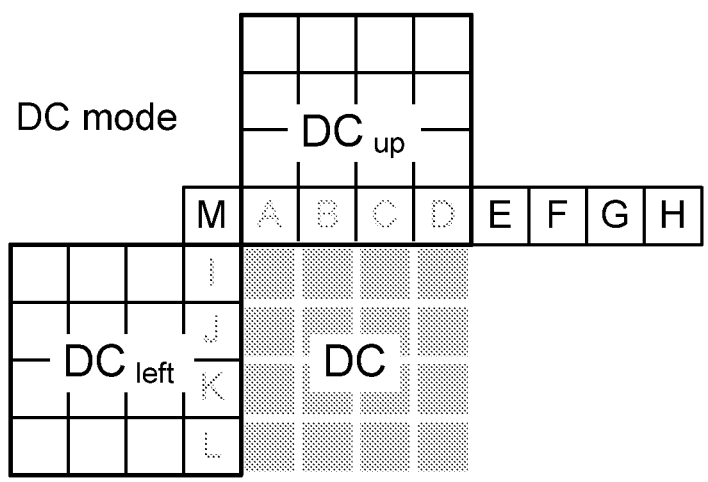
Figure 8:
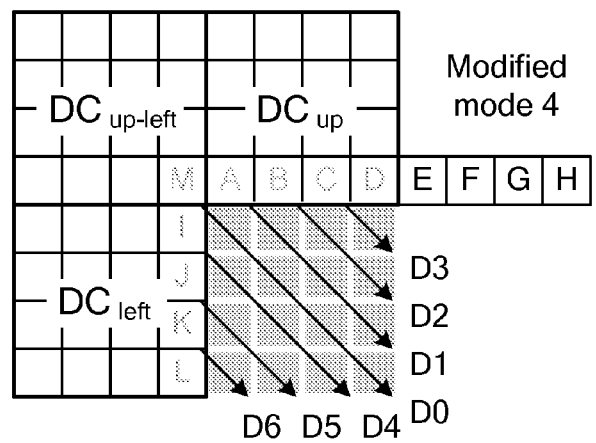
Figure 9:
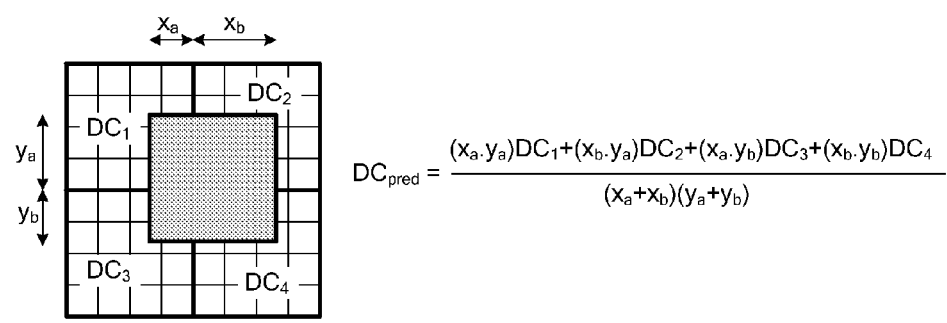
Figure 10:
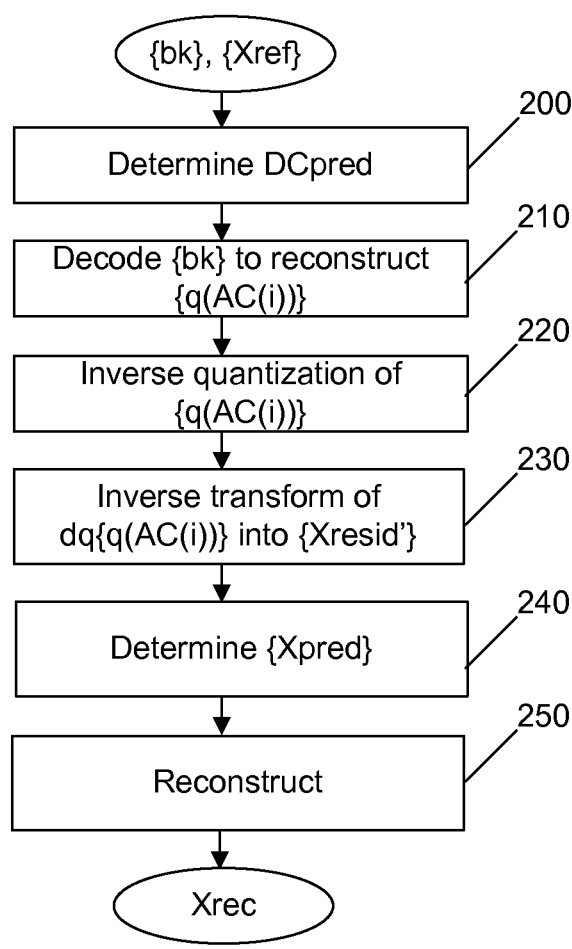
Figure 11:
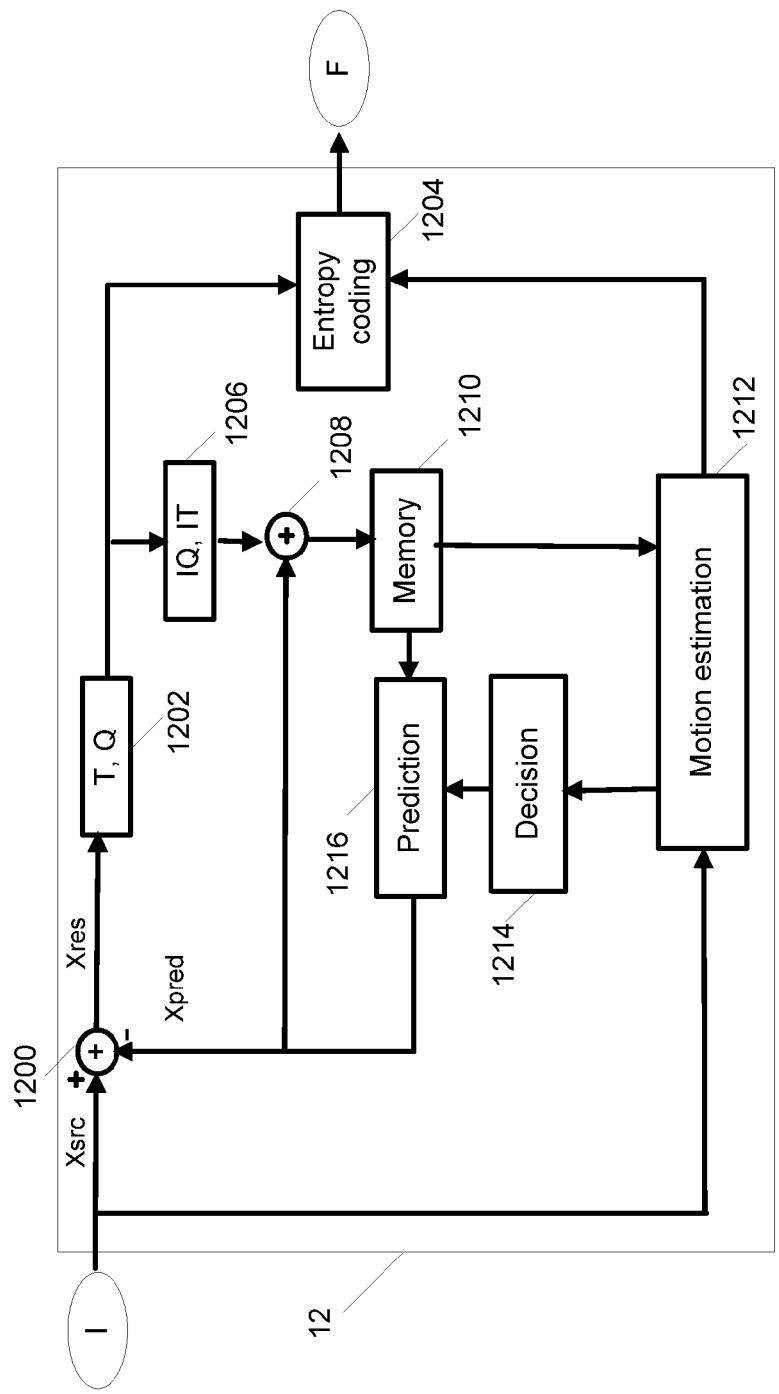
Figure 12:
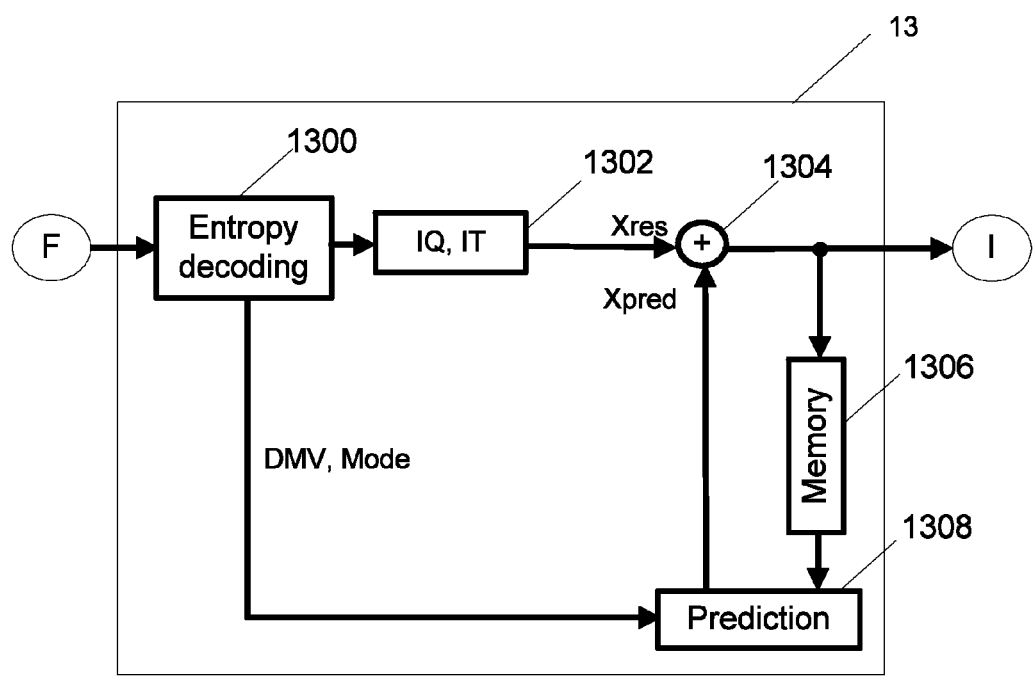

The invention will be better understood and illustrated by means of non-restrictive embodiments and advantageous implementations, with reference to the accompanying drawings, wherein:
FIG. 1 shows a transcoding device according to the prior art,
FIG. 2 shows a diagram of the coding method according to a first embodiment of the invention,
FIG. 3 shows a diagram of the coding method according to a second embodiment of the invention,
FIG. 4 shows the transformation steps of the method according to a second embodiment of the invention,
FIG. 5 shows the spatial prediction method according to a first INTRA coding mode,
FIG. 6 shows the spatial prediction method according to a second INTRA coding mode,
FIG. 7 shows the spatial prediction method according to a third INTRA coding mode,
FIG. 8 shows the spatial prediction method according to a fourth INTRA coding mode,
FIG. 9 shows the temporal prediction method according to an INTER coding mode,
FIG. 10 shows a diagram of the decoding method according to the invention,
FIG. 11 shows a coding device according to the invention, and
FIG. 12 shows a decoding device according to the invention.

5. DETAILED DESCRIPTION OF THE INVENTION

Either a block Xsrc of N pixels or picture points belonging to a picture. With each pixel i of the block Xsrc is associated at least one picture data Xsrc(i), for example a luminance value and/or chrominance values.

Assume that the picture data are transformed by a transform T, then:

$$T(Xsrc) = \text{Coef}(i)_{i=0, \ldots N-1} = \{DC, AC(i)_{i=1, \ldots N-1}\}$$

Where DC is the continuous component and AC(i) are the components known as alternative or non continuous components.

Due to a notable property of T, the following relationship is verified:

$$DC = R' * \sum_{i=0}^{N-1} Xsrc(i) = R'*N*Avg(Xsrc) = R*Avg(Xsrc)$$

R is a proportionality coefficient that depends on the transform T. For example if T is the DCT (Discrete Cosine Transform) transform 4×4, R=16.

FIG. 2 shows a coding method of such a block Xsrc of N pixels or picture points belonging to a picture of a sequence of pictures according to a first implementation of the invention.

At step 100, a prediction coefficient DCpred is determined for the block Xsrc. This prediction coefficient DCpred is able to predict the DC coefficient or continuous component of the block Xsrc. More specifically DCpred is determined from the DC coefficients of reference blocks previously coded and reconstructed, noted as DCrec. In fact, the block Xsrc is a block predicted either spatially if it is in INTRA mode or temporally if it is in INTER mode from reference blocks previously coded and reconstructed. In the case of INTRA mode, the reference blocks are blocks spatially neighbouring the block Xsrc. They belong to the same picture as the block Xsrc. In the case of INTER mode, the reference blocks are blocks located in other pictures of the sequence than that to which the block Xsrc belongs.

At step 110, a prediction value Xpred(i) is determined for each pixel i of the block Xsrc, i varying from 0 to N−1. The values Xpred(i) are determined such that their average on the block Xsrc is proportional to the prediction coefficient DCpred determined in step 100 to a proportionality coefficient R close, i.e. DCpred=R*Avg(Xpred). The proportionality coefficient R depends on the first transform T used by the coding method in step 130.

At step 120, a residual value Xres(i) is calculated for each pixel i of the block Xsrc as follows: Xres(i)=Xsrc(i)−Xpred (i). The block composed of residual values Xres(i) associated with each pixel i of the block Xsrc is called the residual block and is noted as Xres.

At step 130, the residual block Xres is transformed by a first transform T into a first block of coefficients $AC(i)_{i=0, \ldots N-1}$. The coefficient AC(0) is the continuous component and corresponds to the DC coefficient.

At step 140, the coefficient AC(0) is replaced by the following DCres difference: (DCsrc−DCpred), where DCsrc is equal to R*Avg(Xsrc). Avg(Xsrc) is equal to the average of picture data of the block Xsrc, i.e.

$$Avg(Xsrc) = \frac{1}{N}\sum_{i=0}^{N-1} Xsrc(i).$$

At step 150, the block of coefficients $AC(i)_{i=0, \ldots N-1}$ after the replacement step 140 is quantized into a block of coefficients q(AC(i)) then coded. According to a first embodiment each coefficient of the block is divided by a predefined quantization step, for example set by a bitrate regulation module, or even set a priori. The quantized coefficients are then coded by entropy coding, for example using VLC (Variable Length Coding) tables.

According to a variant embodiment, this step implements the quantization and coding method described in the document ISO/IEC 14496-10 entitled *Advanced Video Coding* and more specifically in sections 8.5 (relating to quantization) and 9 (relating to entropy coding). Those skilled in the art can also refer to the book by Iain E Richardson entitled *H.264 and MPEG-4 Video Compression* published in September 2003 by John Wiley & Sons. However, the invention is in no way linked to this standard that is cited only as an example.

It should be noted that to code other blocks, the value DCrec=DCpred+dq(q(DCres)) is calculated for the current block Xsrc, where dq(.) is the inverse quantization function of the quantization function q(.) applied in step 150.

A second embodiment of the coding method according to the invention is described in reference to FIG. 3. In this figure, the steps of the method identical to those of the method according to the first embodiment are identified using the same numerical references and are not described in further detail. The coding method according to this second embodiment comprises all the steps of the method described in reference to FIG. 2. The steps 100 to 140 are reiterated on several spatially neighbouring Xsrc blocks. In FIG. 4, 16 neighbouring blocks are represented. Each black square represents the continuous component of the block after the replacement step 140, i.e. the value DCsrc−DCpred.

The method also comprises a step 145 of transformation of coefficients DCres=(DCsrc−DCpred) of neighbouring blocks. For this purpose, in reference to FIG. 4, a block of coefficients (DCsrc−DCpred) is formed from the corresponding coefficients in the neighbouring blocks. This block of coefficients (DCsrc−DCpred) is transformed by a second transform into a second block of coefficients.

In step 150, the coefficients of the second block of coefficients and the coefficients of neighbouring blocks different to the coefficient (DCsrc−DCpred), i.e. $AC(i)_{i=1, \ldots N-1}$, are quantized then coded.

The coding methods described in reference to FIGS. 2 to 4 apply to any type of coding method. In the specific case of the H.264 video coding standard described in the document ISO/IEC 14496-10 as well as in the book by Iain E Richardson entitled *H.264 and MPEG-4 Video Compression* published in September 2003 by John Wiley & Sons, several coding modes are described to predict a block of pixels Xsrc. These different coding modes define the way that, for a block Xsrc, the corresponding prediction block Xpred is determined. According to the invention, these modes are modified to take into account the constraint set in step 110, that is the values Xpred(i) are determined such that their average on the block Xsrc are proportional to the prediction coefficient DCpred determined in step 100 to a proportionality coefficient R close.

The H.264 standard defines the spatial prediction modes used to predict a block Xsrc in INTRA mode. According to the invention, the spatial prediction modes are modified such that Xpred=Xn−DCn/R+DCpred/R, where DCn=R*Avg (Xn) and where Xn are reconstructed pixels, neighbouring the block Xsrc used in the context of the H.264 standard to predict the pixels of the block Xsrc. In this case, the constraint set in step 110 is necessarily verified.

Among these modes features the horizontal prediction mode shown in FIG. 5. In this figure, the block Xsrc is a block of 4×4 pixels shown in grey. In this mode the pixels of the first line of the block Xsrc are predicted from pixel I, the pixels of the second line are predicted from pixel J, the pixels of the third line are predicted from pixel K and the pixels of the fourth line are predicted from pixel L that belong to the block situated left of the block Xsrc. According to the invention, the horizontal prediction mode is modified as follows:

the pixels of the first line of the block Xsrc are predicted from the following value: $I-(I+J+K+L+2)/4+DC_{Left}/R$, the pixels of the second line are predicted from pixel $J-(I+J+K+L+2)/4+DC_{Left}/R$, the pixels of the third line are predicted from pixel $K-(I+J+K+L+2)/4+DC_{Left}/R$ and the pixels of the fourth line are predicted from pixel $L-(I+J+K+L+2)/4+DC_{Left}/R$.

In this case DCpred=DCLeft. The average of the pixels I, J, K and L equals $(I+J+K+L+2)/4$. By adding 2 before dividing by 4 makes it possible to find the nearest integer, the operation/being an integer division, thus returning the integer part of the quotient. According to a variant, the horizontal prediction mode is modified as follows:

the pixels of the first line of the block Xsrc are predicted from the following value: $I-(I+J+K+L)/4+DC_{Left}/R$, the pixels of the second line are predicted from pixel $J-(I+J+K+L)/4+DC_{Left}/R$, the pixels of the third line are predicted from pixel $K-(I+J+K+L)/4+DC_{Left}/R$ and the pixels of the fourth line are predicted from pixel $L-(I+J+K+L)/4+DC_{Left}/R$.

In this variant 2 is not added before dividing by 4.

In the same way, in reference to FIG. 6, the H.264 vertical prediction mode is modified as follows:

the pixels of the first column of the block Xsrc are predicted from the following value: $A-(A+B+C+D+2)/4+DC_{Up}/R$, the pixels of the second column are predicted from pixel $B-(A+B+C+D+2)/4+DC_{Up}/R$, the pixels of the third column are predicted from pixel $C-(A+B+C+D+2)/4+DC_{Up}/R$ and the pixels of the fourth column are predicted from pixel $D-(A+B+C+D+2)/4+DC_{Up}/R$.

In this case DCpred=DCUp. The average of the pixels A, B, C and D equals $(A+B+C+D+2)/4$. By adding 2 before dividing by 4 makes it possible to find the nearest integer, the operation/being an integer division, thus returning the integer part of the quotient. According to a variant, the horizontal prediction mode is modified as follows:

the pixels of the first column of the block Xsrc are predicted from the following value: $A-(A+B+C+D)/4+DC_{Up}/R$, the pixels of the second column are predicted from pixel $B-(A+B+C+D)/4+DC_{Up}/R$, the pixels of the third column are predicted from pixel $C-(A+B+C+D)/4+DC_{Up}/R$ and the pixels of the fourth column are predicted from pixel $D-(A+B+C+D)/4+DC_{Up}/R$.

In this variant 2 is not added before dividing by 4.

Among these modes features the DC prediction mode shown in FIG. 7. In this figure, the block Xsrc is a block of 4×4 pixels shown in grey. In this mode all the pixels of the block Xsrc are predicted from the pixels A, B, C, D, I, J, K and L. According to the invention, the DC prediction mode is modified so that the pixels of the block Xsrc are predicted from the following value:

$$\forall i, Xpred(i)=DCpred$$

In this case DCpred=(DCLeft+DCUp)/2 or DCpred=2*(DCLeft+DCUp+2)/4.

Among these modes feature the diagonal prediction modes such as the prediction mode shown in FIG. 8 known as "diagonal down-right" mode. In this figure, the block Xsrc is a block of 4×4 pixels shown in gray. In this mode all the pixels of the block Xsrc are predicted from the pixels A, B, C, D, I, J, K L and M. According to the invention, the diagonal prediction mode orientated towards the right is modified so that the pixels of the block Xsrc are predicted from the following value:

$$Xpred(i)=Xn-(C+2B+3A+4M+3I+2J+K+8)/16+2*(DC_{Left}+DC_{Up}+DC_{Up-Left}+3)/(6*R);$$

with Xn which is the prediction value defined by the H.264 standard.

For example for the 4 pixels of the diagonal D0 of Xsrc $$Xpred(i)=M-(C+2B+3A+4M+3I+2J+K+8)/16+2*(DC_{Left}+DC_{Up}+DC_{Up-Left}+3)/(6*R);$$

For the 3 pixels of diagonal D1:

$$Xpred(i)=A-(C+2B+3A+4M+3I+2J+K+8)/16+2*(DC_{Left}+DC_{Up}+DC_{Up-Left}+3)/(6*R);$$

For the 2 pixels of diagonal D2:

$$Xpred(i)=B-(C+2B+3A+4M+3I+2J+K+8)/16+2*(DC_{Left}+DC_{Up}+DC_{Up-Left}+3)/(6*R);$$

For the pixel of diagonal D3:

$$Xpred(i)=C-(C+2B+3A+4M+3I+2J+K+8)/16+2*(DC_{Left}+DC_{Up}+DC_{Up-Left}+3)(6*R);$$

For the 3 pixels of diagonal D4:

$$Xpred(i)=I-(C+2B+3A+4M+3I+2J+K+8)/16+2*(DC_{Left}+DC_{Up}+DC_{Up-Left}+3)(6*R);$$

For the 3 pixels of diagonal D5:

$$Xpred(i)=J-(C+2B+3A+4M+3I+2J+K+8)/16+2*(DC_{Left}+DC_{Up}+DC_{Up-Left}+3)/(6*R);$$

For the pixel of diagonal D6:

$$Xpred(i)=K-(C+2B+3A+4M+3I+2J+K+8)/16+2*(DC_{Left}+DC_{Up}+DC_{Up-Left}+3)/(6*R);$$

In this case $DCpred=2*(DC_{Left}+DC_{Up}+DC_{Up-Left}+3)/6$. However, any linear combination of $DC_{Left}$, $DC_{Up}$, $DC_{Up-Left}$ can be used for DCpred.

The other diagonal modes of the H.264 standard can be modified in the same way as the mode shown in FIG. 8, to the extent that Xpred=Xn−DCn/R+DCpred/R. The average of the pixels A, B, C, I, J, K and M equals−(C+2B+3A+4M+3I+2J+K+8)/16. By adding 8 before dividing by 16 makes it possible to find the nearest integer, the operation/being an integer division, thus returning the integer part of the quotient. According to a variant, the horizontal prediction mode is modified as follows:

For example for the 4 pixels of the diagonal D0 of Xsrc $$Xpred(i)=M-(C+2B+3A+4M+3I+2J+K)/16+(DC_{Left}+DC_{Up}+DC_{Up-Left})/(3*R);$$

For the 3 pixels of diagonal D1:

$$Xpred(i)=A-(C+2B+3A+4M+3I+2J+K)/16+(DC_{Left}+DC_{Up}+DC_{Up-Left}+)/(3*R);$$

For the 2 pixels of diagonal D2:

$$Xpred(i)=B-(C+2B+3A+4M+3I+2J+K)/16+(DC_{Left}+DC_{Up}+DC_{Up-Left})/(3*R);$$

For the pixel of diagonal D3:

$$Xpred(i)=C-(C+2B+3A+4M+3I+2J+K)/16+(DC_{Left}+DC_{Up}+DC_{Up-Left})(3*R);$$

For the 3 pixels of diagonal D4:

$$Xpred(i)=I-(C+2B+3A+4M+3I+2J+K)/16+(DC_{Left}+DC_{Up}+DC_{Up-Left})(3*R);$$

For the 3 pixels of diagonal D5:

$$X\text{pred}(i)=J-(C+2B+3A+4M+3I+2J+K)/16+(DC_{Left}+DC_{Up}+DC_{Up-Left})/(3*R);$$

For the pixel of diagonal D6:

$$X\text{pred}(i)=K-(C+2B+3A+4M+3I+2J+K)/16+(DC_{Left}+DC_{Up}+DC_{Up-Left})/(3*R);$$

The H.264 standard also defines the temporal prediction modes to predict an Xsrc block in INTER mode. According to the invention, the temporal prediction modes are modified, in reference to FIG. 9, such that Xpred=MV(Xref)−DCmv/R+DCpred/R, where DCmv=R*Avg(MV(Xref)) and where MV(Xref) are pixels reconstructed from reference block(s) used in the context of the H.264 standard to predict the pixels of the Xsrc block. In this case, the constraint set in step 110 is necessarily verified.

For example, $$DCpred = \frac{(xa \cdot ya)DC1 + (xb \cdot ya)DC2 + (xa \cdot yb)DC3 + (xb \cdot yb)DC4}{(xa+xb)(ya+yb)}$$

where:
DC1, DC2, DC3 and DC4 are DC coefficients of the reference block previously coded and reconstructed, and
(xa.ya) is the surface of Xsrc predicted by the reference block whose DC coefficient is equal to DC1,
(xb.ya) is the surface of Xsrc predicted by the reference block whose DC coefficient is equal to DC2,
(xa.yb) is the surface of Xsrc predicted by the reference block whose DC coefficient is equal to DC3, and
(xb.yb) is the surface of Xsrc predicted by the reference block whose DC coefficient is equal to DC1.

In this particular case, the reference blocks in question belong to a reference picture other than that belonging to the Xsrc block.

According to a particular embodiment, only the modified INTRA modes can be used with the non-modified INTER modes.

According to a particular embodiment, only the modified INTER modes can be used with the non-modified INTRA modes.

According to another variant, the modified INTRA and INTER modes are used.

The coding methods according to the preceding embodiments offer the advantage of avoiding the drift phenomenon when the stream of coded data that they generate is transcoded using the FPDT transcoding method. The Xsrc block prediction is slightly modified as concerns the DC coefficients while it remains identical for the AC coefficients with respect to the prediction as defined in the original standard, namely the H.264 standard. Thus, the performance in terms of the compression rate is only slightly impacted while in the case of transcoding by FPDT, the quality of the transcoded stream is improved by suppression of the drift effect.

Moreover, such methods predict the DC coefficients independently of the AC coefficients, that is only from the DC coefficients of reference blocks previously coded and reconstructed, said reference blocks belonging to reference pictures in the case of INTER or to the current picture in the case of INTRA. This enables as another advantage a reconstruction of a sequence of low resolution pictures without applying any inverse (DCT) transform by only reconstructing the DC coefficients. In the standard case, when the AC and DC coefficients are predicted together, the reconstruction of a low resolution picture from only DC coefficients is only possible on condition that the AC coefficients are also decoded.

In reference to FIG. 10, the invention relates to a method for decoding a stream of coded data representative of a block Xsrc of a picture belonging to sequence of pictures with a view to the reconstruction of this block Xsrc.

At step 200, a prediction coefficient DCpred is determined for the block Xsrc. This prediction coefficient DCpred is able to predict the DC coefficient, or continuous component of the block Xsrc. More specifically DCpred is determined from the DC coefficients of reference blocks previously coded and reconstructed, noted as DCrec. In fact, the block Xsrc is a block predicted either spatially if it is in INTRA mode or temporally if it is in INTER mode from reference blocks previously coded and reconstructed. In the case of INTRA mode, the reference blocks are spatially neighbouring blocks of the block Xsrc they therefore belong to the same picture as the block Xsrc. In the case of INTER mode, the reference blocks are blocks located in other pictures of the sequence than that to which the block Xsrc belongs.

In step 210, the coded data {bk} representative of the block Xsrc are decoded to reconstruct the coefficients q(AC(i)). Step 210 is an entropy decoding step. It corresponds to the entropy coding step 150 of the coding method.

In step 220, the coefficients are dequantized by inverse quantization into dequantized coefficients dq(q(AC(i))). It corresponds to the quantization step 150 of the coding method. More specifically, it implements the inverse of the quantization step applied in step 150 of the coding method.

In step 230, the dequantized coefficients (dq(q(AC(i)))) are transformed into residual values Xresid' by an inverse transformation to that applied in step 130 of the coding method. As an example, if the step 130 of the coding method implements a DCT transform then step 230 implements an IDCT (Inverse Discrete Cosine Transform) transform.

Naturally the invention is in no way limited by the type of transform used. Other transforms can be used, for example the Hadamard transform.

In step 240, a prediction value Xpred(i) is determined for each pixel i of the block Xsrc, i varying from 0 to N−1. The values Xpred(i) are determined such that their average on the block Xsrc is proportional to a proportionality coefficient R close to the prediction coefficient DCpred determined in step 200. The proportionality coefficient R depends on the transform $T^{-1}$ used by the decoding method in step 230, and thus consequently depends on the transform T used by the coding method in step 130.

In step 250, a picture data Xrec(i) is reconstructed for each pixel of the block Xsrc by summing the prediction value Xpred(i) and the residual value Xresid(i) corresponding to the pixel i.

It should be noted that to reconstruct other blocks, the value DCrec=DCpred+dq(q(AC(0))) is calculated for the current block Xsrc.

The decoding method has the advantage of enabling a reconstruction of a sequence of pictures at low resolution by only reconstructing the DC coefficients. In the standard case, when the AC and DC coefficients are predicted together, the reconstruction of a low resolution picture from only DC coefficients is only possible on condition that the AC coefficients are also decoded. In fact, in the present case, the DC coefficients are predicted independently of the AC coefficients, that is, only from the DC coefficients of reference blocks previously reconstructed.

The invention also relates to a coding device 12 described with reference to FIG. 11. The coding device 12 receives at the input, pictures I belonging to a sequence of pictures. Each picture is divided into blocks of pixels with each of which at least one picture data is associated. The coding device 12 notably comprises a calculation module 1200 capable of subtracting pixel by pixel from a current block Xsrc, according to step 120 of the coding method, a prediction block Xpred to generate a residual picture data block or residual block noted as Xres. It further comprises a module 1202 capable of transforming then quantizing the residual block Xres into quantized data. The transform T is for example a discrete cosine transform (or DCT). The module 1202 notably implements step 130 of the coding method. It also implements the replacement step 140 and the quantization step 150. The coding module 12 also comprises an entropy coding module 1204 able to code quantized data in a stream F of coded data. The entropy coding module 1204 implements the coding step 150 of the coding method. It also comprises a module 1206 carrying out the inverse operation of module 1202. The module 1206 carries out an inverse quantization IQ followed by an inverse transform IT. The module 1206 is connected to a calculation module 1208 able to add pixel by pixel the block of data from the module 1206 and the prediction block Xpred to generate a block of reconstructed picture data that is stored in a memory 1210.

The coding device 12 further comprises a motion estimation module 1212 capable of estimating at least one motion vector between the block Xsrc and a reference picture stored in the memory 1210, this picture having previously been coded then reconstructed. According to a variant the motion estimation can be carried out between the current block Xsrc and the original reference picture. According to a method known to those skilled in the art, the motion estimation module 1212 searches in the reference picture for a motion vector so as to minimise the error calculated between the current block Xsrc and a reference block Xref in the reference picture identified using said motion vector.

The motion data are transmitted by the motion estimation module 1212 to a decision module 1214 able to select a coding mode for the block Xsrc in a predefined set of coding modes. The term "motion data" is to be understood in the widest sense, i.e. motion vector and possibly a reference picture index identifying the picture in the sequence of pictures. The coding modes of the predefined set of coding modes are defined such that the constraint defined in step 110 of the coding method is verified.

The chosen coding mode is for example the one that minimizes a bitrate-distortion type criterion. However, the invention is not restricted to this selection method and the mode chosen can be selected according to another criterion for example an a priori type criterion. The coding mode selected by the decision module 1214 as well as the motion data, for example the item or items of motion data, in the case of the temporal prediction mode or INTER mode, are transmitted to a prediction module 1216. The coding mode and possibly the item or items of motion data selected are also transmitted to the entropy coding module 1204 to be coded in the stream F. The prediction module 1216 determines the prediction block Xpred according to steps 100 and 110 of the coding method notably from reference pictures Ir previously reconstructed and stores in the memory 1210, the coding mode and possibly the item or items of motion data selected by the decision module 1214. It is noted that the coefficient DCrec of the block Xsrc is also reconstructed and stored in the memory 1210 with a view to the reconstruction of other blocks. The modules 1200, 1202, 1204, 1206, 1210, 1214 form a group of modules called coding modules.

The invention further relates to a decoding device 13 described with reference to FIG. 12. The decoding device 13 receives at the input a stream F of coded data representative of a sequence of pictures. The stream F is for example generated and transmitted by a coding device 12. The decoding device 13 comprises an entropy decoding module 1300 able to generate decoded data, e.g. coding modes and decoded data relating to the content of the pictures. For this purpose the entropy decoding device 1300 implements step 210 of the decoding method.

The decoding device 13 further comprises a motion data reconstruction module. According to a first embodiment, the motion data reconstruction module is the entropy decoding module 1300 that decodes a part of the stream F representative of said motion vectors.

According to a variant not shown in FIG. 13, the motion data reconstruction module is a motion estimation module. This solution for reconstructing motion data by the decoding device 13 is known as "template matching".

The decoded data relative to the content of pictures that correspond to quantized data from the module 1202 of the coding device 12 are then transmitted to a module 1302 able to carry out an inverse quantization followed by an inverse transform. The module 1302 notably implements the inverse quantization step 220 and the inverse transform step 230 of the decoding method. The module 1302 is identical to the module 1206 of the coding module 12 that generated the coded stream F. The module 1302 is connected to a calculation module 1304 able to add pixel by pixel, according to step 250 of the decoding method, the block from the module 1302 and a prediction block Xpred to generate a block of reconstructed picture data that is stored in a memory 1306. The decoding device 13 also comprises a prediction module 1216 of the coding device 12. The prediction module 1308 determines the prediction block Xpred according to steps 200 and 240 of the decoding method from notably reference pictures Ir previously reconstructed and stored in the memory 1306, DC coefficients reconstructed from reference blocks also stored in the memory 1306, the coding mode and possibly motion data for the current block Xsrc decoded by the entropy decoding module 1300. It is to be noted that the coefficient DCrec of the block Xsrc is also reconstructed and stored in the memory 1306 with a view to the reconstruction of other blocks. The modules 1302, 1304, 1306 form a group of modules called the reconstruction module.

In FIGS. 11 and 12, the modules shown are functional units that may or may not correspond to physically distinguishable units. For example, these modules or some of them can be grouped together in a single component, or constitute functions of the same software. On the contrary, some modules may be composed of separate physical entities. As an example, the module 1202 can be implemented by separate components, one carrying out a transform and the other a quantization.

Obviously, the invention is not limited to the embodiment examples mentioned above.

In particular, those skilled in the art may apply any variant to the stated embodiments and combine them to benefit from their various advantages. Notably, the invention is in no way limited to specific picture coding standard. The only condition is that the prediction modes verify the following constraints:

Case INTRA: $Xpred = Xn - DCn/R + DCpred/R$

Case INTER: $Xpred = MV(Xref) - DCmv/R + DCpred/R$ with DCpred that is determined from DC coefficients of reference blocks previously reconstructed.

The invention claimed is:

1. Method for coding a block of a picture belonging to a sequence of pictures, said block comprising pixels with each of which at least one picture data is associated comprising the following steps:
   a) determining a prediction coefficient DCpred of a DC coefficient of said block from a DC coefficient of at least one previously reconstructed reference block,
   b) determining, for each pixel of said block, a prediction value equal to $Xn-Avg(Xn)+DCpred/R$ when said block is an INTRA block and to $MV(Xref)-Avg(MV(Xref))+DCpred/R$ when said block is an INTER block,
   where:
   R is a proportionality coefficient,
   Xn are the previously reconstructed values of pixels of neighbouring blocks used for the prediction of said block,
   Avg(.) is the average function,
   Xref are the previously reconstructed values of pixels of reference blocks used for the prediction of said block, and
   MV(.) is a motion compensation function;
   c) calculating, for each pixel of said block, a residual value by subtracting from the picture data of said pixel the prediction value (Xpred) of said pixel,
   d) transforming said block of residual values by a first transform into a first block of coefficients,
   e) replacing, in said first block of coefficients, the coefficient DC by the difference between the product of said proportionality coefficient and said average of picture data of said block and said prediction coefficient, and
   f) quantizing and coding said first block of coefficient.

2. Method for coding according to claim 1, wherein said steps a), b), c), d) and e) being applied to a plurality of spatially neighbouring blocks, said method comprises, before the step of quantizing and coding, a step of transformation by a second transform of at least a part of said coefficients of said first blocks of coefficients into a second block of coefficients.

3. Method for decoding a stream of coded data representative of a block of a picture belonging to a sequence of pictures with a view to the reconstruction of said block, said block comprising pixels with each of which at least one picture data is associated comprising the following steps:
   determining a prediction coefficient DCpred of a DC coefficient of said block from a DC coefficient of at least one previously reconstructed reference block,
   decoding from said stream the coded data representative of said block to reconstruct coefficients,
   inverse quantization of coefficients of said block into dequantized coefficients,
   inverse transformation by an inverse transform of dequantized coefficients into residual values,
   determining a prediction value for each of the pixels of the block equal to $Xn-Avg(Xn)+DCpred/R$ when said block is an INTRA block and to $MV(Xref)-Avg(MV(Xref))+DCpred/R$ when said block is an INTER block,
   where:
   R is a proportionality coefficient,
   Xn are the previously reconstructed values of pixels of neighbouring blocks used for the prediction of said block,
   Avg(.) is the average function,
   Xref are the previously reconstructed values of pixels of reference blocks used for the prediction of said block, and
   MV(.) is a motion compensation function; and
   reconstructing for each pixel of said block a picture data by summing, for said pixel, said prediction value and said residual value corresponding to said pixel.

4. Coding device of a sequence of pictures, each picture of said sequence being divided into blocks of pixels with each of which at least one picture data is associated, comprising:
   a prediction module for determining a prediction coefficient DCpred of a DC coefficient of a block of a picture of said sequence from a DC coefficient of at least one reference block previously reconstructed and a prediction value equal to $Xn-Avg(Xn)+DCpred/R$ when said block is an INTRA block and to $MV(Xref)-Avg(MV(Xref))+DCpred/R$ when said block is an INTER block,
   where:
   R is a proportionality coefficient,
   Xn are the previously reconstructed values of pixels of neighbouring blocks used for the prediction of said block,
   Avg(.) is the average function,
   Xref are the previously reconstructed values of pixels of reference blocks used for the prediction of said block, and
   MV(.) is a motion compensation function;
   a calculation module for calculating, for each of the pixels of said block, a residual value by subtracting from the picture data of said pixel the prediction value of said pixel,
   a transformation module for transforming said block of residual values by a first transform into a first block of coefficients, for replacing, in said first block of coefficients, the DC coefficient by the difference between the product of said proportionality coefficient and said average of picture data of said block and said prediction coefficient, and for quantizing said first block of coefficients, and
   a coding module for coding said first block of coefficients.

5. Decoding device of a stream of coded data representative of a sequence of pictures, each picture being divided into blocks of pixels with each of which at least one picture data is associated, comprising:
   a decoding module for decoding from the stream the coded data representative of a block of a picture of said sequence to reconstruct coefficients,
   a module for applying an inverse quantization and an inverse transform on said coefficients to generate residual values,
   a prediction module for determining a prediction coefficient DCpred of a DC coefficient of said block from the DC coefficient of at least one reference block previously reconstructed and a prediction value equal to $Xn-Avg(Xn)+DCpred/R$ when said block is an INTRA block and to $MV(Xref)-Avg(MV(Xref))+DCpred/R$ when said block is an INTER block,
   where:
   R is a proportionality coefficient,
   Xn are the previously reconstructed values of pixels of neighbouring blocks used for the prediction of said block,
   Avg(.) is the average function,
   Xref are the previously reconstructed values of pixels of reference blocks used for the prediction of said block, and
   MV(.) is a motion compensation function;
   a reconstruction module for reconstructing for each pixel of said block a picture data by summing, for said pixel, said prediction value and said residual value corresponding to said pixel.

* * * * *